(12) United States Patent
He et al.

(10) Patent No.: US 11,384,982 B2
(45) Date of Patent: Jul. 12, 2022

(54) DUAL-PURPOSE SINTERING FURNACE

(71) Applicant: LIAONING UPCERA CO., LTD, Benxi (CN)

(72) Inventors: Lingling He, Benxi (CN); Yao Xu, Beijing (CN); Ying Guo, Benxi (CN); Huailing Li, Beijing (CN); Jialing Li, Benxi (CN)

(73) Assignee: LIAONING UPCERA CO., LTD., Benxi (CN)

( * ) Notice: Subject to any disclaimer, the term of this patent is extended or adjusted under 35 U.S.C. 154(b) by 456 days.

(21) Appl. No.: 16/615,548

(22) PCT Filed: Jun. 14, 2017

(86) PCT No.: PCT/CN2017/088296
§ 371 (c)(1),
(2) Date: Nov. 21, 2019

(87) PCT Pub. No.: WO2018/214186
PCT Pub. Date: Nov. 29, 2018

(65) Prior Publication Data
US 2020/0173722 A1    Jun. 4, 2020

(30) Foreign Application Priority Data

May 24, 2017   (CN) .......................... 201720588167.3

(51) Int. Cl.
F27B 5/14        (2006.01)
F27B 3/18        (2006.01)
(Continued)

(52) U.S. Cl.
CPC .................. *F27B 3/18* (2013.01); *F27B 3/12* (2013.01); *F27B 3/28* (2013.01); *F27M 2003/04* (2013.01)

(58) Field of Classification Search
CPC ...... F27B 3/18; F27B 3/12; F27B 3/28; F27B 17/00; F27B 17/0016; F27B 17/0033;
(Continued)

(56) References Cited

U.S. PATENT DOCUMENTS 3,441,652 A * 4/1969 Eicker ..................... F27D 11/02
                                                                 219/390
4,415,145 A * 11/1983 Herdieckerhoff .... C21D 9/0062
                                                                 266/253
(Continued)

FOREIGN PATENT DOCUMENTS

CN         101907395 A      12/2010
CN         102095310 A       6/2011
(Continued)

OTHER PUBLICATIONS

International Search Report for International Application No. PCT/CN2017/088296 dated Jan. 25, 2018.

*Primary Examiner* — Hung D Nguyen
(74) *Attorney, Agent, or Firm* — Suiter Swantz pc llo

(57) ABSTRACT

A dual-purpose sintering furnace including a furnace body having a furnace chamber, a first furnace mouth and a second furnace mouth which are communicated with the furnace chamber, a furnace door hinged to the furnace body and configured for closing the first furnace mouth, a blocking member lap-jointed inside the furnace chamber and configured for blocking the second furnace mouth, a sample (Continued)

stage, an ejection rod fixedly arranged on a sample placement face of the sample stage, a lifting device configured for driving the sample stage to raise or lower, so that the ejection rod pushes the blocking member until the second furnace mouth is opened, and so that the sample stage enters the furnace chamber through the second furnace mouth. The dual-purpose sintering furnace can complete a large amount of sintering as conventional sintering and also implement rapid sintering.

13 Claims, 5 Drawing Sheets

(51) Int. Cl.
*F27B 3/12* (2006.01)
*F27B 3/28* (2006.01)

(58) Field of Classification Search
CPC .......... F27B 17/02; F27B 17/025; F27B 5/04; F27B 5/06; F27B 5/12; F27B 5/13; F27B 5/14; F27B 5/18; F27B 2017/0091; A61C 13/083; A61C 13/12; A61C 13/20; A61C 13/203; F27D 2003/0034; F27D 2003/0075; F27D 2003/0086; F27M 2003/04
USPC ........ 432/120, 121, 125, 241, 242; 219/390, 219/391, 392, 393, 396
See application file for complete search history.

(56) References Cited

U.S. PATENT DOCUMENTS

| | | | | |
|---|---|---|---|---|
| 4,417,346 | A * | 11/1983 | Giler | ....................... F27B 14/06 |
| | | | | 373/137 |
| 6,252,202 | B1 * | 6/2001 | Zychek | ................. F27B 17/025 |
| | | | | 219/390 |
| 8,109,761 | B1 * | 2/2012 | Neal | ..................... F27B 17/025 |
| | | | | 432/189 |
| 8,890,036 | B2 * | 11/2014 | Serrago | ..................... F27B 5/14 |
| | | | | 219/390 |
| 2004/0247013 | A1 | 12/2004 | Clark et al. | |
| 2007/0082307 | A1 * | 4/2007 | Zubler | ................... A61C 13/20 |
| | | | | 431/120 |
| 2008/0090195 | A1 | 4/2008 | Takahashi et al. | |
| 2011/0075696 | A1 | 3/2011 | Ford | |
| 2014/0113237 | A1 * | 4/2014 | Rohner | ................. F27B 17/025 |
| | | | | 219/390 |

FOREIGN PATENT DOCUMENTS

| | | |
|---|---|---|
| CN | 203037063 U | 7/2013 |
| CN | 204159874 U | 2/2015 |
| CN | 206019324 U | 3/2017 |
| EP | 0091742 A2 | 3/1983 |
| JP | 6-94374 A | 4/1994 |

* cited by examiner

DUAL-PURPOSE SINTERING FURNACE

The present application claims the priority to a Chinese patent application No. 201720588167.3, filed with the China National Intellectual Property Administration on May 24, 2017 and entitled "dual-purpose sintering furnace", which is incorporated herein by reference in its entirety.

TECHNICAL FIELD

The present application relates to the field of a sintering device, and in particular to a dual-purpose sintering furnace.

BACKGROUND

A zirconia restoration widely used in dental restoration treatment is formed of zirconia ceramics by sintering. In order to meet the immediate restoration requirement for the dental restoration treatment, the sintering of zirconia ceramics needs to be completed quickly in a sintering furnace.

Currently, the sintering furnace includes a conventional sintering furnace and a rapid sintering furnace. For the conventional sintering furnace, a sample is placed into a furnace chamber firstly and then a heating body is started to heat the furnace chamber such that the sample is preheated and sintered. For the rapid sintering furnace, the furnace chamber is preheated firstly and then the sample is sent into the furnace chamber for sintering. It can be seen that the short sintering time of the rapid sintering furnace can meet the sintering requirement for the zirconia restoration. But there is a problem that as compared to the conventional sintering furnace, a smaller number of samples can be simultaneously sintered in the rapid sintering furnace due to the structural limitation thereof.

Therefore, in the actual production, in order to meet different sintering requirements, a user needs to purchase two kinds of devices, i.e., a conventional sintering furnace and a rapid sintering furnace, which leads to an extremely high operating cost for the user.

In view of this, it is urgent for those skilled in the art to develop a sintering furnace, which can not only complete a large amount of sintering as conventional sintering, but also implement rapid sintering.

SUMMARY

The purpose of an embodiment of the present application is to provide a dual-purpose sintering furnace for solving the problems existing in the prior art. The technical solutions are as follows.

A dual-purpose sintering furnace includes:
a furnace body having a furnace chamber, and a first furnace mouth and a second furnace mouth which are communicated with the furnace chamber;
a furnace door hinged to the furnace body and configured for closing the first furnace mouth;
a blocking member lap-jointed inside the furnace chamber and configured for blocking the second furnace mouth;
a sample stage;
an ejection rod fixedly arranged on a sample placement face of the sample stage;
a lifting device configured for driving the sample stage to rise or lower, so that the ejection rod pushes the blocking member until the second furnace mouth is opened, and so that the sample stage enters the furnace chamber through the second furnace mouth.

Optionally, the dual-purpose sintering furnace includes a plurality of ejection rods, and connection points where at least three ejection rods of the plurality of ejection rods are connected to the sample stage are not collinear.

Optionally, the dual-purpose sintering furnace includes four ejection rods which are equal in height and arranged in parallel with each other.

Optionally, cross sections of the plurality of ejection rods are sectors, and all of the sectors are arranged concentrically.

Optionally, the blocking member includes a lap-jointed plate and a blocking plate which are superposed and fixedly connected;
when the second furnace mouth is in a blocked state, the lap-jointed plate is lap-jointed to an inner wall of the furnace chamber, and the blocking plate is inserted into the second furnace mouth.

Optionally, the furnace chamber is a square furnace chamber, and the lap-jointed plate is a square lap-jointed plate.

Optionally, the second furnace mouth is a cylindrical hole, and the blocking plate is a cylindrical plate.

Optionally, the blocking member is specifically an alumina ceramic fiber blocking member or a polycrystalline mullite fiber blocking member.

Optionally, the ejection rod is specifically a ceramic ejection rod.

Optionally, the lifting device is specifically a hydraulic cylinder, a piston rod of which is fixedly connected to the sample stage.

Optionally, the sample stage includes a stop plate and a material containing plate which are superposed and fixedly connected;
when the sintering furnace is in a sintering working condition, the material containing plate enters the furnace chamber through the second furnace mouth, and an upper end face of the stop plate abuts against a lower end face of the furnace body.

Optionally, the sintering furnace further includes a control device, which is arranged outside the furnace chamber and configured for controlling a temperature inside the furnace chamber and a rising and lowering speed of the sample stage.

Optionally, the ejection rod is specifically a hollow ejection rod.

Compared with the prior art, the dual-purpose sintering furnace provided in the present application can not only complete a large amount of sintering as conventional sintering, but also implement rapid sintering.

BRIEF DESCRIPTION OF THE DRAWINGS

In order to describe the embodiments of the present application and the technical solutions in the prior art more clearly, drawings needed to be used in the embodiments and the prior art will be briefly described below. Obviously, the drawings below are for only some embodiments of the present application, and those skilled in the art can also obtain other drawings based on these drawings without any creative efforts.

Wherein, the correspondence between the name of each component and the corresponding reference number in FIG. 1 to FIG. 7 is.

1 furnace body, 11 first furnace mouth, 12 second furnace mouth;
2 furnace door;
3 blocking member, 31 lap-jointed plate, 32 blocking plate;
4 sample stage, 41 material containing plate, 42 stop plate;
5 ejection rod;
6 lifting device; and
7 control device.

DETAILED DESCRIPTION

In order to make objectives, technical solutions and advantages of the present invention more apparent, the present invention now will be described in detail with reference to the drawings and the embodiments. Obviously, the embodiments described are only some of the embodiments of the present invention instead of all the embodiments. All other embodiments obtained based on the embodiments in the present invention by those skilled in the art without any creative efforts are within the protection scope of the present invention.

Figure 1:
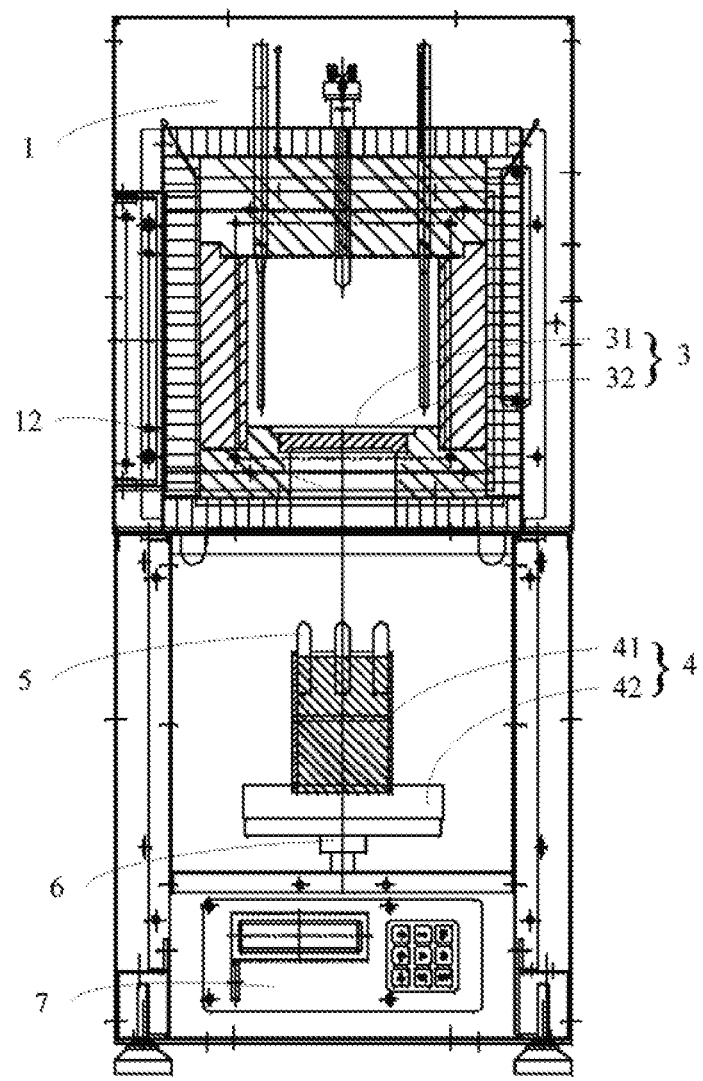
FIG. 1 is a schematic structural view of an embodiment of a dual-purpose sintering furnace provided by the present application.

It should be noted that orientation words in this application such as above and below are defined based on a position where a sintering furnace shown in FIG. 1 is placed.

For ease of illustration, in this embodiment, the working condition of the sintering furnace when a lifting device 6 of the sintering furnace drives the sample stage 4 to lower to a loading or unloading position is defined as a "loading or unloading working condition"; the working condition of the sintering furnace when the lifting device 6 of the sintering furnace drives the sample stage 4 to rise to a sintering position is defined as a "sintering working condition".

Figure 2:
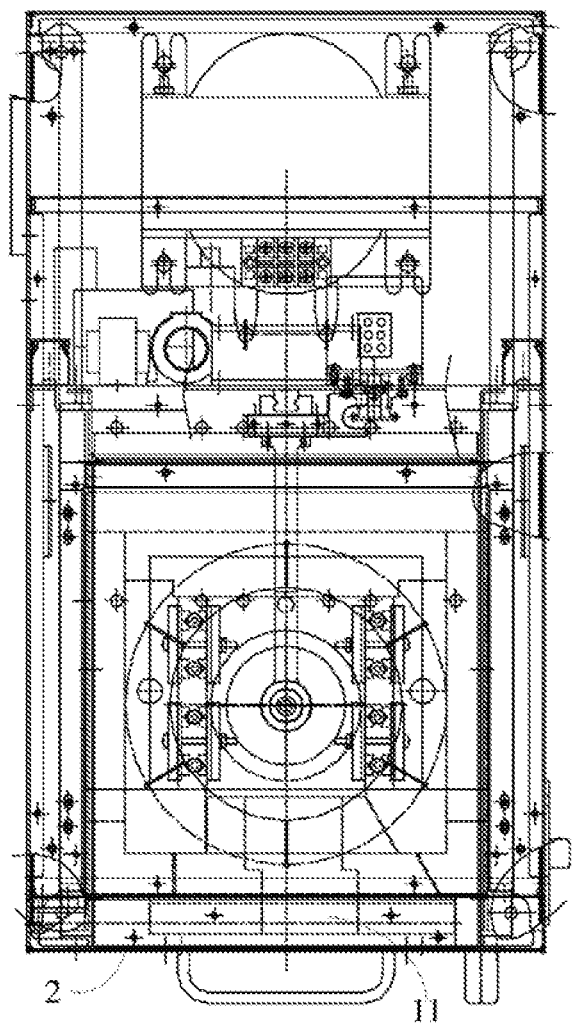
FIG. 2 is a top view of FIG. 1.

Referring to FIG. 1 and FIG. 2, a dual-purpose sintering furnace disclosed in this embodiment includes a furnace body 1, a furnace door 2, a blocking member 3, a sample stage 4, an ejection rod 5, and a lifting device 6.

Wherein, the furnace body 1 has a furnace chamber, and a first furnace mouth 11 and a second furnace mouth 12 which are communicated with the furnace chamber. The furnace door 2 is hinged to the furnace body 1 and is configured for closing the first furnace mouth 11. The blocking member 3 is lap-jointed inside the furnace chamber and is configured for blocking the second furnace mouth 12. The ejection rod 5 is fixedly arranged on a sample placement face of the sample stage 4. The lifting device 6 is configured for driving the sample stage 4 to rise or lower, so that the ejection rod 5 pushes the blocking member 3 until the second furnace mouth 12 is opened, and so that the sample stage 4 enters the furnace chamber through the second furnace mouth 12. In order to facilitate a better understanding of a specific structure of the dual-purpose sintering furnace disclosed in this embodiment, please refer to FIG. 3.

It can be understood that a door handle is arranged on the furnace door 2 in order to facilitate the opening and closing of the furnace door 2. In order to lock the furnace door 2 after the furnace door 2 closes the first furnace mouth 11, a locking device for the furnace door 2 is arranged on the furnace door 2.

In practical applications, during the initial working position of the sample stage 4, the sintering furnace is in the loading working condition, and the furnace door 2 is in a closed state. When conventional sintering is required, the furnace door 2 is opened, a sample is placed on an upper surface of the blocking member 3 through the first furnace mouth 11, then the furnace door 2 is closed, and conventional sintering is carried out according to a preset procedure.

When rapid sintering is required, a sample is placed on the sample placement face of the sample stage 4. The temperature inside the furnace chamber is preset, for example, as 1300° C. to 1600° C. After the temperature inside the furnace chamber reaches the preset temperature, the lifting device 6 drives the sample stage 4 to rise to a certain height (i.e., a height at which the upper end of the ejection rod 5 is contacted with the blocking member 3) at a preset speed, and the ejection rod 5 is contacted with the blocking member 3. The lifting device 6 drives the sample stage 4 to rise continuously to the sintering position at the preset speed, and the blocking member 3 is slowly lifted by the ejection rod 5, so that the ejection rod 5 pushes the blocking member 3 until the second furnace mouth 12 is opened, and so that the sample stage 4 enters the furnace chamber through the second furnace mouth 12.

Thereafter, a constant temperature process inside the furnace chamber is completed according to a set procedure. After the constant temperature process is completed, the lifting device 6 drives the sample stage 4 to lower at a preset speed. When the sample stage 4 is lowered to a certain height (i.e., a height at which the upper end of the ejection rod 5 is disengaged from the blocking member 3), the ejection rod 5 is disengaged from the blocking member 3, the blocking member 3 is lap-jointed inside the furnace chamber, and the second furnace mouth 12 is blocked again, so that the temperature inside the furnace chamber is maintained at a preset temperature until the next rapid sintering. The lifting device 6 drives the sample stage 4 to lower continuously to an unloading position at a preset speed, i.e., the rapid sintering process is completed.

The dual-purpose sintering furnace provided in this embodiment can not only complete a large amount of sintering as conventional sintering, but also implement rapid sintering. The dual-purpose sintering furnace provided in this embodiment may meet different sintering requirements, and the user does not need to purchase both of two kinds of devices, i.e., a conventional sintering furnace and a rapid sintering furnace. Therefore, the extremely high operating cost for the user can be reduced.

Specifically, the dual-purpose sintering furnace provided in the embodiment may include a plurality of ejection rods 5. Connection points where at least three ejection rods 5 of the plurality of ejection rods 5 are connected to the sample stage 4 are not collinear to ensure that the ejection rods 5 can stably push the blocking member 3 to rise. It can be understood that the connection points where the ejection rods 5 are connected to the sample stage 4 are intersection points between the ejection rods 5 and the sample placement face of the sample stage 4.

More specifically, the dual-purpose sintering furnace provided in this embodiment may include four ejection rods 5. The four ejection rods 5 are cylindrical, and are equal in height and vertically provided. That is, the four ejection rods 5 are arranged in parallel with each other, and every two of the four ejection rods 5 are provided symmetrically.

Figure 4:
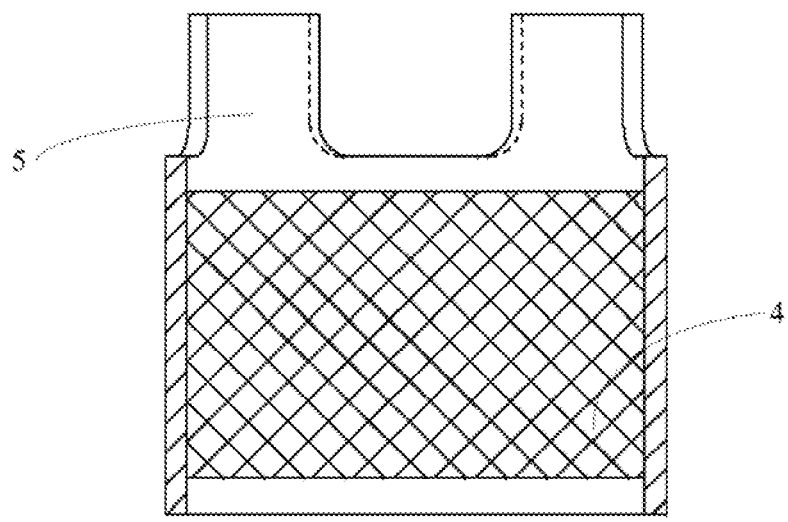
FIG. 4 is a first schematic structural view of ejection rods in an embodiment of a dual-purpose sintering furnace provided by the present application.
Figure 5:
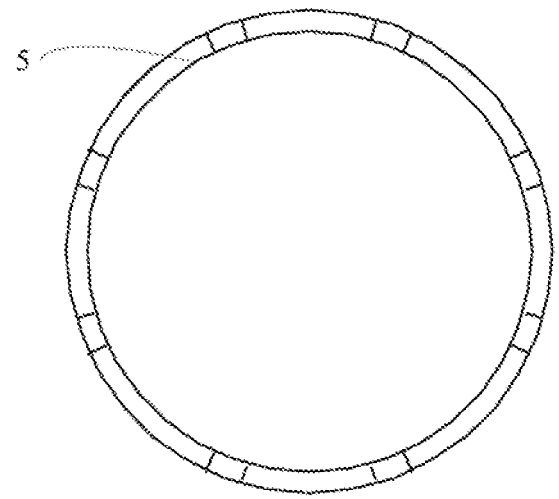
FIG. 5 is a top view of FIG. 4.

Alternatively, as an optional solution, the cross sections of the plurality of ejection rods 5 are sectors, all of which are arranged concentrically. Specifically, there may be four ejection rods 5. Referring to FIG. 4 and FIG. 5, the cross sections of the four ejection rods 5 are sectors and the four sectors are arranged concentrically. The four ejection rods 5 are equal in height and vertically provided, that is, the four ejection rods 5 are arranged in parallel with each other, and every two of the four ejection rods 5 are provided symmetrically.

Preferably, the ejection rods 5 in this embodiment may be ceramic ejection rods, and may also be other high-temperature resistant ejection rods, which are not specifically limited herein.

Figure 6:
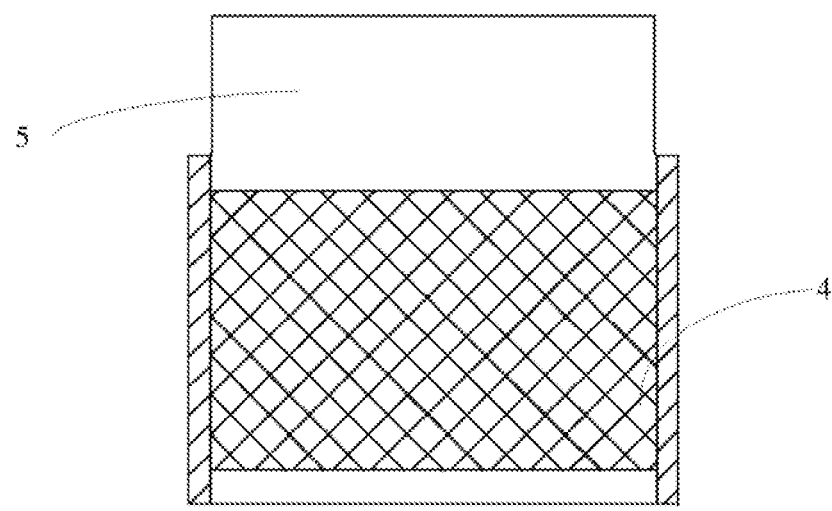
FIG. 6 is a second schematic structural view of ejection rods in an embodiment of a dual-purpose sintering furnace provided by the present application.
Figure 7:
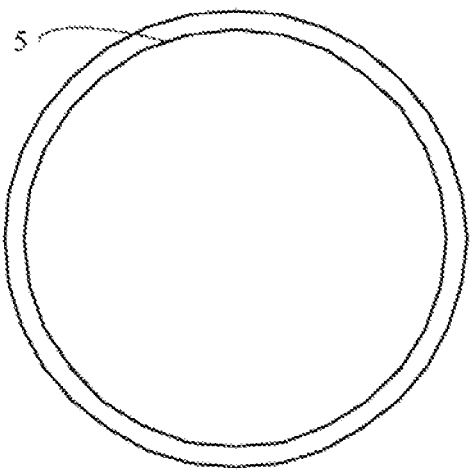
FIG. 7 is a top view of FIG. 6.

Specifically, please refer to FIG. 6 and FIG. 7, in order to further ensure that the ejection rods 5 can stably push the blocking member 3 to rise, the ejection rods 5 may be hollow to ensure that supporting areas of the ejection rods when pushing the blocking member 3 can be large enough. In practical applications, the hollow ejection rods are fixed on the sample placement face of the sample stage 4, and the user puts the sample on the sample stage through central holes of the hollow ejection rods.

Optionally, the hollow ejection rods may be made of high-temperature resistant ceramic or refractories, which are not specifically limited herein.

In practical applications, the blocking member 3 may be made of a high-temperature resistant material, such as alumina ceramic fiber or polycrystalline mullite fiber, or made of other high-temperature resistant materials, which is not specifically limited herein.

Please refer to FIG. 1, the blocking member 3 of the dual-purpose sintering furnace provided in this embodiment includes a lap-jointed plate 31 and a blocking plate 32 which are superposed and fixedly connected.

Wherein, the lap-jointed plate 31 is lap-jointed to an inner wall of the furnace chamber, and the blocking plate 32 is inserted into the second furnace mouth 12.

In order to ensure that a larger number of samples can be sintered during conventional sintering, that is, to ensure a larger placement area for the sample, the cross-sectional shape of the lap-jointed plate 31 is the same as that of the furnace chamber. For example, the furnace chamber is a square furnace chamber, and correspondingly the lap-jointed plate 31 is a square lap-jointed plate. It can be understood that the area of the lap-jointed plate 31 is smaller than that of the inner wall of the furnace chamber as the lap-jointed plate 31 is lap-jointed to the inner wall of the furnace chamber.

In order to ensure that the blocking member 3 can block the second furnace mouth 12 better during the rapid sintering process, the second furnace mouth 12 is a trapezoidal hole, and the shape of the second furnace mouth 12 is the same as that of the cross-section of the blocking member 3. For example, the second furnace mouth 12 is a cylindrical hole, and correspondingly the blocking plate 32 is a cylindrical plate. It should be noted that a large diameter hole of the second furnace mouth 12 is located above a small diameter hole thereof, and the blocking plate 32 is inserted into the large diameter hole of the second furnace mouth 12 to block the small diameter hole of the second furnace mouth 12.

Preferably, the lifting device 6 in this embodiment is specifically a hydraulic cylinder, a piston rod of which is fixedly connected to the sample stage for driving the sample stage 4 to rise or lower. Of cause, the lifting device 6 may also be another device that can perform a driving function, such as a mechanical arm device, which is not limited herein.

Figure 3:
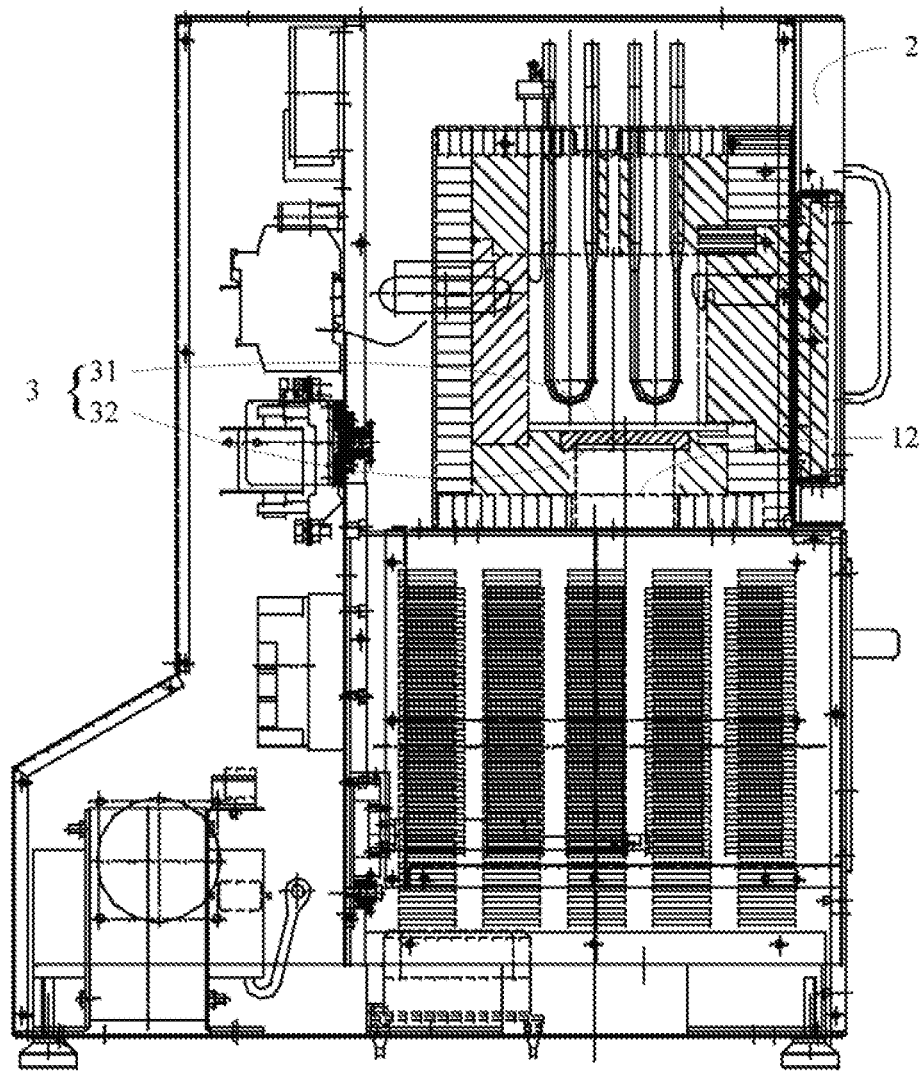
FIG. 3 is a left view of FIG. 1.

Please refer to FIG. 1 and FIG. 3, the sample stage 4 in this embodiment includes a stop plate 42 and a material containing plate 41 which are superposed and fixedly connected.

The material containing plate 41 is located above the stop plate 42, the outer diameter of the material containing plate 41 is smaller than the outer diameter of the second furnace mouth 12, and the outer diameter of the stop plate 42 is larger than the outer diameter of the material containing plate 41.

When the sintering furnace is in the sintering working condition, a sample is placed on the upper surface of the material containing plate 41, the material containing plate 41 enters the furnace chamber through the second furnace mouth 12, and the upper end face of the stop plate 42 abuts against the lower end face of the furnace body 1. On one hand, the material containing plate 41 may send the sample into the furnace chamber for sintering, through the second furnace mouth 12. On the other hand, the material containing plate 41 blocks the second furnace mouth 12, which can reduce the heat exchange between the inside and the outside of the furnace chamber during the rapid sintering process. Moreover, the upper end face of the stop plate 42 abuts against the lower end face of the furnace body 1, which can further close the furnace chamber, reduce heat loss and accelerate the sintering.

Furthermore, the dual-purpose sintering furnace provided in this embodiment further includes a control device 7, which is arranged outside the furnace chamber and configured for controlling the temperature inside the furnace chamber and the rising and lowering speed of the sample stage 4.

It should be noted that the terms "include", "comprise" or any other variants thereof in this application are intended to cover a non-exclusive inclusion, so that processes, methods, articles or devices comprising a series of elements comprise not only those elements listed but also other elements not specifically listed or the elements intrinsic to these processes, methods, articles, or devices. Without further limitations, elements defined by the sentences "comprise(s) a . . . " or "include(s) a . . . " do not exclude that there are additional identical elements in the processes, methods, articles, or devices which include the listed elements.

All embodiments in the description are described in a correlated manner, and identical or similar parts in various embodiments can be referred to one another, the description for each embodiment focuses on the differences from the other embodiments.

The embodiments described above are merely preferable embodiments of the present application, and not intended to limit the protection scope of the present application. Any modifications, equivalents, improvements or the like made within the spirit and principle of the present application shall be included within the protection scope of the present application.

The invention claimed is:

1. A dual-purpose sintering furnace, comprising:
   a furnace body (1) having a furnace chamber, and a first furnace mouth (11) and a second furnace mouth (12) which are communicated with the furnace chamber;
   a furnace door (2) hinged to the furnace body (1) and configured for closing the first furnace mouth (11);

a blocking member (3) lap-jointed inside the furnace chamber and configured for blocking the second furnace mouth (12);

a sample stage (4);

an ejection rod (5) fixedly arranged on a sample placement face of the sample stage (4);

a lifting device (6) configured for driving the sample stage (4) to rise or lower, so that the ejection rod (5) pushes the blocking member (3) until the second furnace mouth (12) is opened, and so that the sample stage (4) enters the furnace chamber through the second furnace mouth (12).

2. The dual-purpose sintering furnace of claim 1, comprising a plurality of ejection rods (5), and connection points where at least three ejection rods (5) of the plurality of ejection rods (5) are connected to the sample stage (4) are not collinear.

3. The dual-purpose sintering furnace of claim 2, comprising four ejection rods (5), which are equal in height and arranged in parallel with each other.

4. The dual-purpose sintering furnace of claim 2, wherein, cross sections of the plurality of ejection rods (5) are sectors, and all of the sectors are arranged concentrically.

5. The dual-purpose sintering furnace of claim 1, wherein, the blocking member (3) comprises a lap-jointed plate (31) and a blocking plate (32) which are superposed and fixedly connected;

when the second furnace mouth (12) is in a blocked state, the lap-jointed plate (31) is lap-jointed to an inner wall of the furnace chamber, and the blocking plate (32) is inserted into the second furnace mouth (12).

6. The dual-purpose sintering furnace of claim 5, wherein, the furnace chamber is a square furnace chamber, and the lap-jointed plate (31) is a square lap-jointed plate.

7. The dual-purpose sintering furnace of claim 5, wherein, the second furnace mouth (12) is a cylindrical hole, and the blocking plate (32) is a cylindrical plate.

8. The dual-purpose sintering furnace of claim 1, wherein, the blocking member (3) is an alumina ceramic fiber blocking member or a polycrystalline mullite fiber blocking member.

9. The dual-purpose sintering furnace of claim 1, wherein, the ejection rod (5) is a ceramic ejection rod.

10. The dual-purpose sintering furnace of claim 1, wherein, the lifting device (6) is a hydraulic cylinder, a piston rod of which is fixedly connected to the sample stage (4).

11. The dual-purpose sintering furnace of claim 1, wherein, the sample stage (4) comprises a stop plate (42) and a material containing plate (41) which are superposed and fixedly connected;

when the sintering furnace is in a sintering working condition, the material containing plate (41) enters the furnace chamber through the second furnace mouth (12), and an upper end face of the stop plate (42) abuts against a lower end face of the furnace body (1).

12. The dual-purpose sintering furnace of claim 1, further comprising a control device (7), which is arranged outside the furnace chamber and configured for controlling a temperature inside the furnace chamber and a rising and lowering speed of the sample stage (4).

13. The dual-purpose sintering furnace of claim 1, wherein, the ejection rod (5) is a hollow ejection rod.

\* \* \* \* \*